United States Patent
Gastle

(10) Patent No.: US 9,150,102 B1
(45) Date of Patent: Oct. 6, 2015

(54) CHASSIS ASSEMBLIES WITH REPOSITIONABLE GEARBOX FOR CHILDREN'S RIDE-ON VEHICLES, AND ASSEMBLY METHODS

(71) Applicant: Mattel, Inc., El Segundo, CA (US)

(72) Inventor: Kevin M. Gastle, Boston, NY (US)

(73) Assignee: Mattel, Inc., El Segundo, CA (US)

( * ) Notice: Subject to any disclaimer, the term of this patent is extended or adjusted under 35 U.S.C. 154(b) by 12 days.

(21) Appl. No.: 14/267,039

(22) Filed: May 1, 2014

(51) Int. Cl.
- B60K 17/04 (2006.01)
- B60K 7/00 (2006.01)
- A63H 17/00 (2006.01)
- A63H 31/00 (2006.01)
- B23P 19/04 (2006.01)

(52) U.S. Cl.
CPC .............. *B60K 17/043* (2013.01); *B23P 19/04* (2013.01); *B60K 7/0007* (2013.01); *B60K 2007/0038* (2013.01)

(58) Field of Classification Search
CPC ..... A63H 17/00; A63H 17/262; A63H 31/00; B60K 17/043; B60K 7/0007; B60K 2007/0038; B23P 19/04; B62K 15/00
See application file for complete search history.

(56) References Cited

U.S. PATENT DOCUMENTS

| | | | |
|---|---|---|---|
| 2,559,935 A | 7/1951 | Brown | |
| 2,973,220 A | 2/1961 | White | |
| 2,975,850 A * | 3/1961 | Dolphin | 180/348 |
| 3,249,171 A | 5/1966 | Kinghom | |
| 3,455,404 A | 7/1969 | Hansen | |
| 3,580,349 A | 5/1971 | Brennan et al. | |
| 3,596,979 A | 8/1971 | Habitzel et al. | |
| 3,632,156 A | 1/1972 | Schweser | |
| 3,664,450 A | 5/1972 | Udden et al. | |
| 3,960,392 A | 6/1976 | Read | |
| 3,966,220 A | 6/1976 | Forsyth et al. | |
| 4,098,517 A | 7/1978 | Sortini | |
| 4,204,697 A | 5/1980 | Santerre | |
| 4,244,592 A | 1/1981 | Lohr | |
| 4,424,978 A | 1/1984 | Kassai | |
| 4,453,763 A | 6/1984 | Richards | |
| 4,513,981 A | 4/1985 | DeGraaff et al. | |
| 4,572,530 A | 2/1986 | Marino | |
| 4,598,923 A * | 7/1986 | Csizmadia | 280/287 |
| 4,682,668 A | 7/1987 | Salmon et al. | |

(Continued)

OTHER PUBLICATIONS

Collapsible Go Kart by Christian Wildiers at Coroflot.com, downloaded from http://www.coroflot.com/cwildiers/Collapsible-Go-Kart on or about Aug. 14, 2013.

(Continued)

*Primary Examiner* — Laura Freedman
(74) *Attorney, Agent, or Firm* — DASCENZO Intellectual Property Law, P.C.

(57) ABSTRACT

Chassis assemblies for children's ride-on vehicles, children's ride-on vehicles including said chassis assemblies, and methods for configuring a children's ride-on vehicle for operation are disclosed. The chassis assembly may include a chassis configured to at least partially define a passenger region sized for a child, a gearbox coupled to the chassis, and an electric motor coupled to the gearbox. The gearbox may be configured to be selectively moved with respect to the chassis, along a path of movement, from a storage configuration to an operating configuration. A greater portion of the gearbox may extend beneath a lower plane defined by the chassis when the gearbox is in the operating configuration than when the gearbox is in the storage configuration.

28 Claims, 4 Drawing Sheets

(56) References Cited

U.S. PATENT DOCUMENTS

| | | | |
|---|---|---|---|
| 4,682,969 A | 7/1987 | Choy et al. | |
| 4,709,958 A | 12/1987 | Harrod | |
| 4,741,544 A | 5/1988 | Kassai | |
| 4,790,552 A | 12/1988 | Lian | |
| 4,813,693 A | 3/1989 | Lockard et al. | |
| 4,823,632 A | 4/1989 | Harrod et al. | |
| 4,988,143 A | 1/1991 | Harrod | |
| 5,020,624 A | 6/1991 | Nesterick et al. | |
| 5,029,666 A * | 7/1991 | Baldoni | 180/208 |
| 5,042,831 A | 8/1991 | Kuhns | |
| RE33,769 E | 12/1991 | Harrod | |
| 5,106,150 A | 4/1992 | Litwicki | |
| D328,317 S | 7/1992 | Harrod | |
| 5,174,627 A | 12/1992 | Cleereman et al. | |
| 5,228,742 A | 7/1993 | Johnson et al. | |
| 5,238,082 A | 8/1993 | Stegeman et al. | |
| D341,393 S | 11/1993 | Chazen et al. | |
| 5,294,153 A | 3/1994 | Nolan | |
| 5,312,126 A * | 5/1994 | Shortt et al. | 280/287 |
| 5,334,078 A | 8/1994 | Hippely et al. | |
| 5,368,121 A | 11/1994 | Priefert | |
| D362,279 S | 9/1995 | Fuligni | |
| 5,474,486 A | 12/1995 | Chilton et al. | |
| 5,497,844 A | 3/1996 | Fritzinger | |
| 5,626,506 A | 5/1997 | Halford et al. | |
| 5,667,868 A | 9/1997 | Freeman | |
| 5,671,934 A | 9/1997 | Harrod | |
| 5,699,869 A | 12/1997 | Fritzinger et al. | |
| 5,714,815 A | 2/1998 | Fritzinger et al. | |
| 5,718,454 A | 2/1998 | Harrod | |
| D393,888 S | 4/1998 | Callif | |
| 5,743,545 A | 4/1998 | Kunze et al. | |
| D397,737 S | 9/1998 | Harrod | |
| 5,931,524 A | 8/1999 | Jones, Jr. | |
| D414,140 S | 9/1999 | Nechushtan et al. | |
| 5,947,795 A | 9/1999 | Cohen | |
| 5,954,364 A | 9/1999 | Nechushtan | |
| 5,954,389 A | 9/1999 | Ringdal et al. | |
| D416,056 S | 11/1999 | Wu | |
| 5,975,625 A | 11/1999 | Simplicean | |
| 5,984,356 A | 11/1999 | Uphaus | |
| D422,320 S | 4/2000 | Huntsberger | |
| 6,065,556 A | 5/2000 | Andrews | |
| D428,076 S | 7/2000 | Wise et al. | |
| 6,120,345 A * | 9/2000 | Lenihan et al. | 446/431 |
| 6,139,061 A | 10/2000 | Lewis | |
| 6,220,654 B1 | 4/2001 | Sommer | |
| 6,273,442 B1 * | 8/2001 | Fallon et al. | 280/287 |
| 6,371,235 B1 | 4/2002 | Wisecarver | |
| 6,450,857 B1 * | 9/2002 | Watanabe | 446/465 |
| 6,509,719 B2 | 1/2003 | Crofut et al. | |
| 6,530,445 B1 | 3/2003 | Flowers et al. | |
| 6,588,189 B2 | 7/2003 | Horejsi et al. | |
| 6,607,207 B2 | 8/2003 | Shapiro et al. | |
| 6,771,034 B2 | 8/2004 | Reile et al. | |
| 6,793,248 B1 | 9/2004 | Sung | |
| 6,854,551 B2 | 2/2005 | Wisecarver | |
| 6,860,512 B2 | 3/2005 | Lawson, Jr. | |
| 6,883,846 B2 | 4/2005 | Cheek et al. | |
| 6,918,171 B2 | 7/2005 | Kucera et al. | |
| 6,918,627 B2 | 7/2005 | Mataja et al. | |
| 6,929,083 B2 | 8/2005 | Hurlbert | |
| 7,055,889 B2 | 6/2006 | Mataja et al. | |
| 7,059,661 B2 | 6/2006 | Mataja et al. | |
| 7,100,929 B2 | 9/2006 | Shapiro et al. | |
| 7,100,968 B2 | 9/2006 | Mataja et al. | |
| 7,150,466 B1 | 12/2006 | Chapman et al. | |
| 7,225,542 B2 | 6/2007 | Chernoff et al. | |
| 7,267,192 B2 | 9/2007 | Lin et al. | |
| 7,325,643 B2 | 2/2008 | Shimizu et al. | |
| 7,413,041 B2 | 8/2008 | Drosendahl et al. | |
| 7,487,982 B2 | 2/2009 | Chan | |
| 7,510,236 B2 | 3/2009 | Hlopick et al. | |
| 7,523,981 B2 | 4/2009 | Karube et al. | |
| 7,527,322 B2 | 5/2009 | Hlopick et al. | |
| 7,527,323 B2 | 5/2009 | Peterson et al. | |
| 7,530,629 B2 | 5/2009 | King et al. | |
| 7,537,271 B2 | 5/2009 | Hlopick et al. | |
| 7,568,753 B2 | 8/2009 | Arendt et al. | |
| 7,591,503 B2 | 9/2009 | Schroeder et al. | |
| D601,640 S | 10/2009 | McIlvain et al. | |
| 7,597,387 B2 | 10/2009 | Hlopick et al. | |
| 7,621,543 B2 | 11/2009 | Arendt et al. | |
| 7,673,719 B2 | 3/2010 | Buschena | |
| 7,762,363 B1 | 7/2010 | Hirschfeld | |
| 7,832,517 B2 * | 11/2010 | Tsai | 180/220 |
| 7,887,074 B2 | 2/2011 | Byers et al. | |
| 7,905,305 B2 | 3/2011 | Lucas et al. | |
| 7,967,101 B2 | 6/2011 | Buschena | |
| 8,038,160 B2 | 10/2011 | Seckel et al. | |
| 8,172,032 B2 | 5/2012 | Buschena | |
| 8,297,686 B2 | 10/2012 | Redmond | |
| 8,382,005 B1 | 2/2013 | Fletcher | |
| 8,453,771 B1 | 6/2013 | Hirschfeld | |
| 8,459,679 B2 | 6/2013 | Jesse, Jr. | |
| 9,016,803 B2 * | 4/2015 | Howell et al. | 301/122 |
| 2004/0194282 A1 | 10/2004 | Kucera et al. | |
| 2005/0067206 A1 | 3/2005 | Trautman et al. | |
| 2005/0161979 A1 | 7/2005 | Chernoff et al. | |
| 2005/0287923 A1 | 12/2005 | Haney | |
| 2005/0287924 A1 | 12/2005 | Haney | |
| 2006/0001227 A1 | 1/2006 | Hong | |
| 2006/0186641 A1 | 8/2006 | Chan | |
| 2006/0278455 A1 | 12/2006 | Padginton et al. | |
| 2008/0116665 A1 | 5/2008 | Nakaizumi et al. | |
| 2008/0129006 A1 | 6/2008 | Johnson et al. | |
| 2008/0258499 A1 | 10/2008 | Cleaves | |
| 2009/0167062 A1 | 7/2009 | Greif et al. | |
| 2011/0018226 A1 | 1/2011 | Jesse, Jr. | |
| 2015/0135981 A1 * | 5/2015 | Gastle et al. | 104/53 |
| 2015/0135982 A1 * | 5/2015 | DeRubes et al. | 104/107 |
| 2015/0135984 A1 * | 5/2015 | Gastle et al. | 104/242 |

OTHER PUBLICATIONS

Folding Wagon Photo Gallery, Fold-it & Go Portable Wagon Photos, downloaded from http://www.foldingwagon.com/photo_gallery.htm on or about Aug. 14, 2013.

Modified Power Wheels—Project: Powertech Go Kart, downloaded from http://www.modifiedpowerwheels.com/forum/topic.asp?TOPIC_ID=12314 on or about Aug. 13, 2013.

One Go-Kart 2 Go Please—GoKart by Beau Reid of Beau Designs, Yanko Design downloaded from http://www.yankodesign.com/2011/06/15/one-go-kart-2-go-please/ on or about Apr. 14, 2014.

Pictures: Go-Kart Folds Up, Fits Inside Suitcase—TechEBlog, downloaded from http://www.techeblog.com/index.php/tech-gadget/pictures-go-kart-folds-up-fits-inside-suitcase on or about Aug. 13, 2013.

* cited by examiner

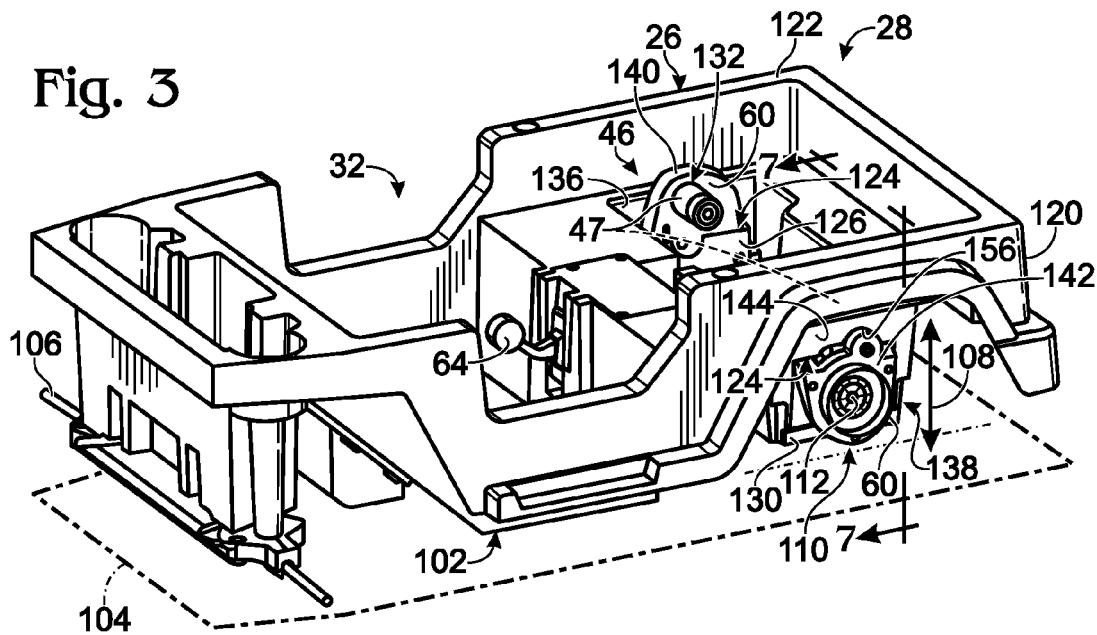

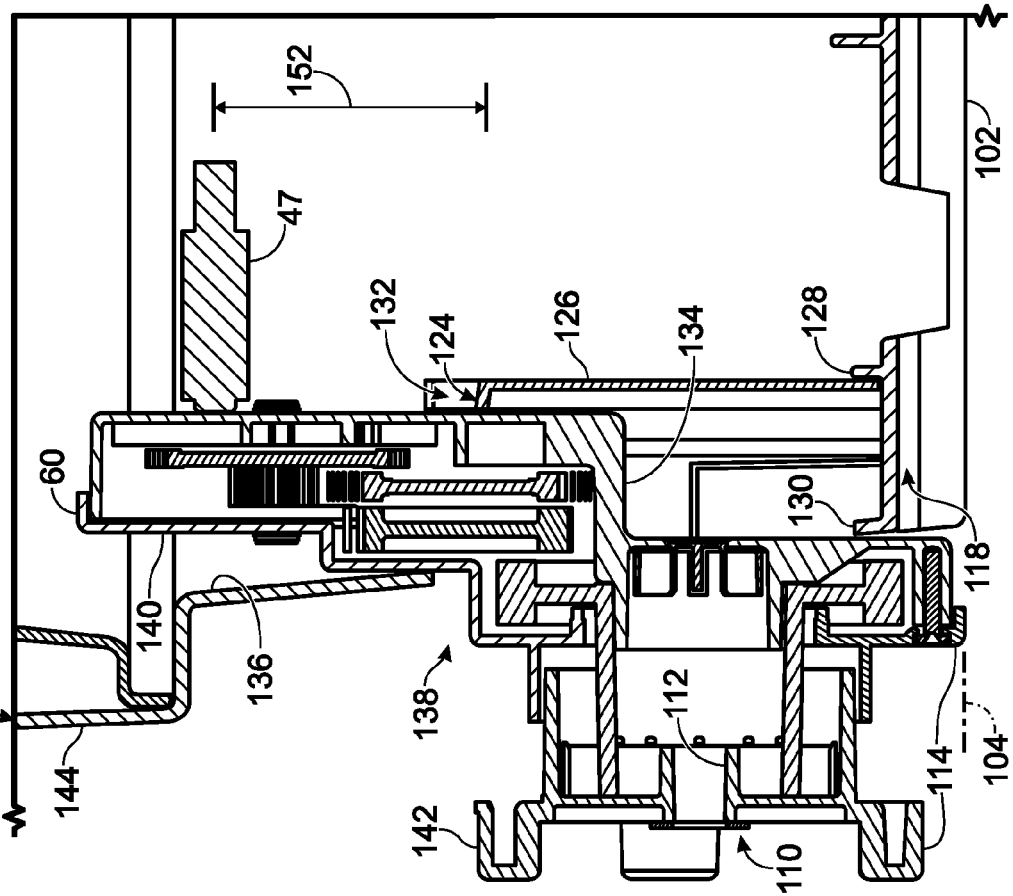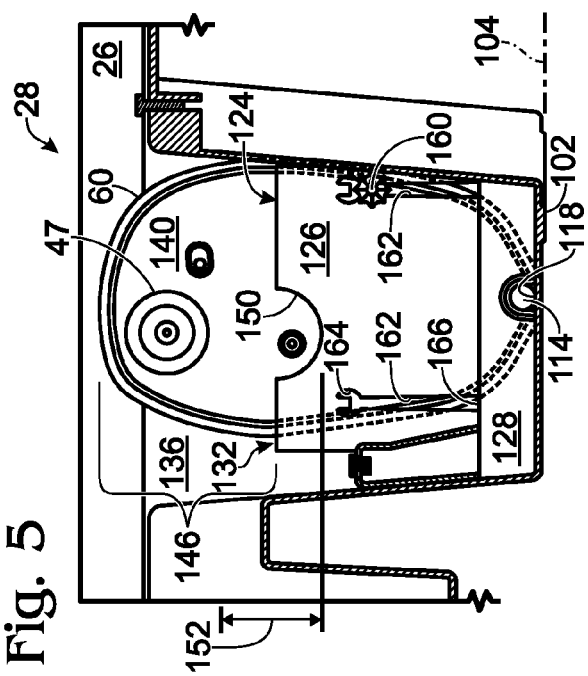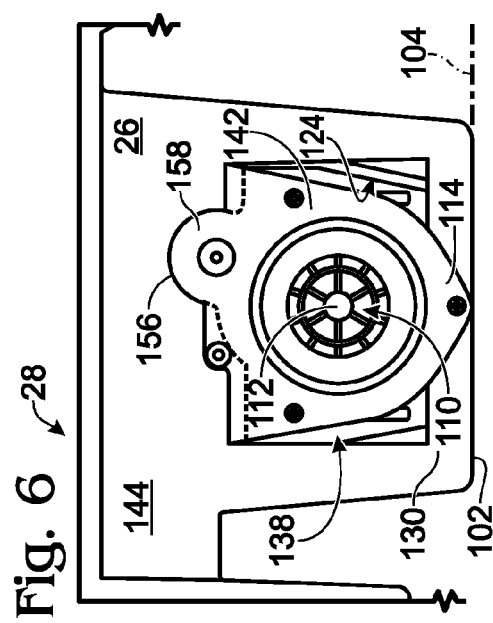

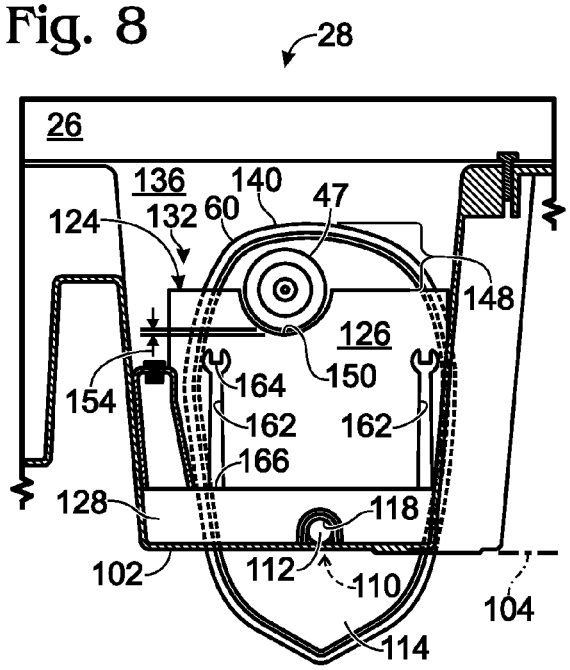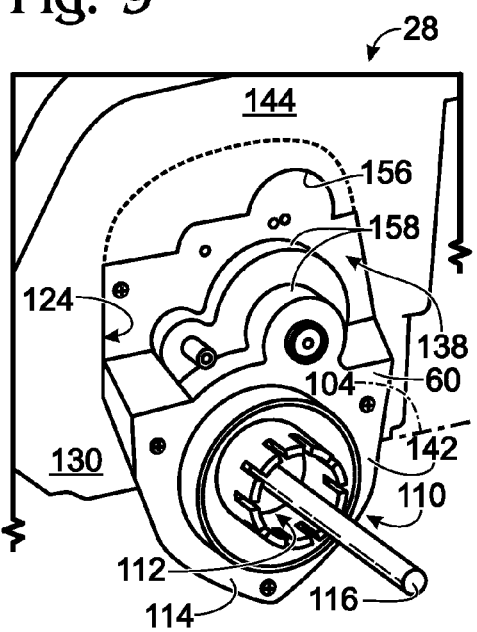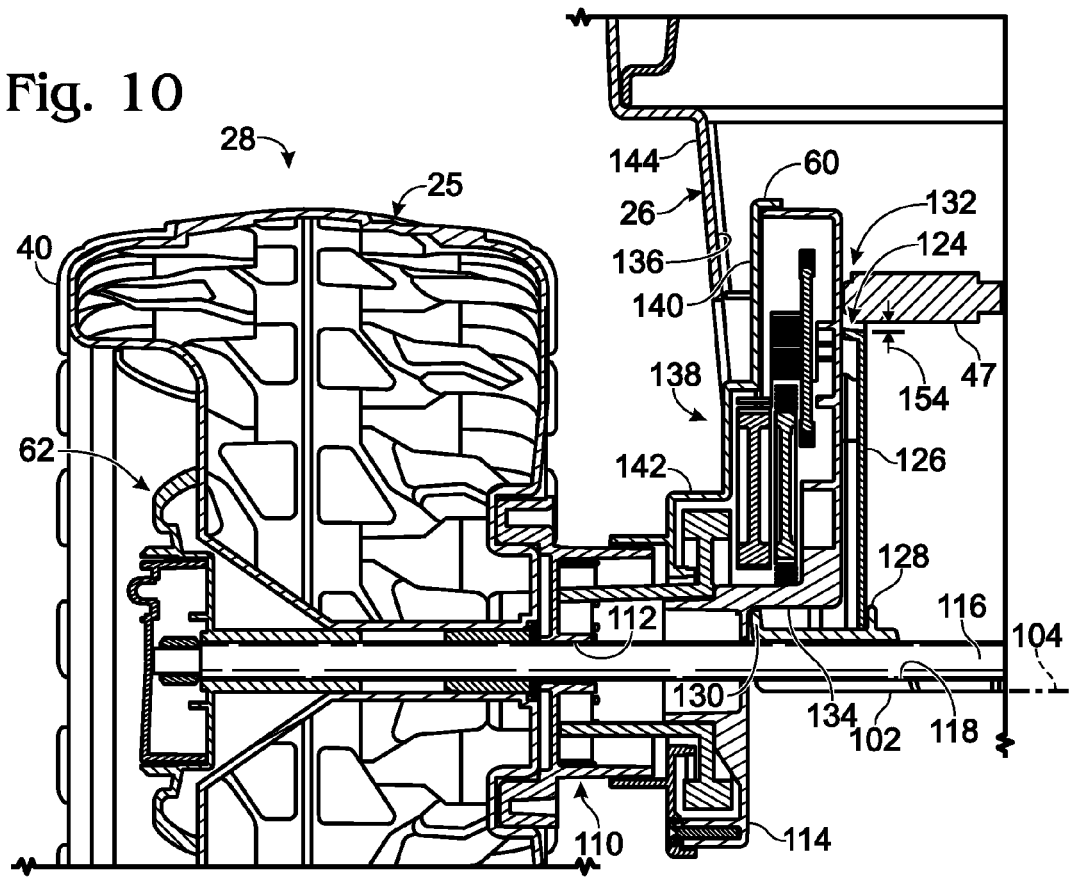

CHASSIS ASSEMBLIES WITH REPOSITIONABLE GEARBOX FOR CHILDREN'S RIDE-ON VEHICLES, AND ASSEMBLY METHODS

FIELD

The present disclosure relates to battery-powered children's ride-on vehicles, and more particularly to a chassis assembly for a battery-powered children's ride-on vehicle, the chassis assembly including a selectively positionable gearbox.

BACKGROUND

Children's ride-on vehicles are reduced-scale vehicles that are designed and sized for use by children. For example, children's ride-on vehicles include a seat adapted to accommodate one or more children, as well as steering and drive assemblies that are adapted to be operated by a child sitting on the seat. The drive assembly is adapted to drive the rotation of one or more of the vehicle's wheels.

One type of drive assembly that is often used in children's ride-on vehicles includes a battery-powered motor assembly that is adapted to drive the rotation of one or more of the vehicle's wheels. Typically, the vehicle will include an actuator, such as a foot pedal, push button or other user input device, which enables a child to select when power is delivered to the motor assembly. Some drive assemblies further include other user input devices, such as a speed selector and/or a direction selector, which are operated by a child sitting on the vehicle's seat to select the speed and/or direction at which the motor assembly is powered, and thus the speed and/or direction at which the vehicle travels.

The packaging and shipment of such children's ride-on vehicles can be a considerable expense for the manufacturers, and thus for purchasers of the children's ride-on vehicles. Shipping companies may charge based on size of a package and/or on the weight of a package. Accordingly, there is an incentive for toy manufacturers to reduce the size of a package as much as reasonably possible. One way in which a package size may be reduced is to package the children's ride-on vehicle in an unassembled condition; however, parents tend to dislike extensive assembly requirements. Moreover, the greater extent of assembly that is required by a parent, the more opportunity there is for parts to be assembled incorrectly or even broken. Even if caused by user error, these assembly errors often result in product returns and/or poor customer satisfaction.

SUMMARY

The present disclosure is directed to chassis assemblies for children's ride-on vehicles having a repositionable gearbox, children's ride-on vehicles including said chassis assemblies and selectively positionable gearboxes, and methods of configuring such children's ride-on vehicles for use. Some embodiments of the disclosed chassis assemblies and children's ride-on vehicles can reduce the packaging size associated with shipment of a children's ride-on vehicle and/or may also reduce the potential for improper assembly. Generally, the vehicle chassis can be configured so that the motors and gearboxes associated with, for example, the rear (or other driven) wheels may be selectively positioned between a storage configuration, or storage position (also referred to herein as a shipping configuration, or a retracted configuration), and an operating configuration (also referred to herein as a deployed, or extended configuration). For example, in the storage configuration, the gearboxes may be raised up so that they do not extend below the bottom surface of the chassis. Accordingly, shallower packaging may be used than otherwise would be possible if the gearboxes extended below the chassis at all times. Also, the storage configurations can help to ensure that the gearboxes are protected from damage during transport of the packaged (and incompletely assembled) children's ride-on vehicle.

A chassis assembly for a children's ride-on vehicle according to the present disclosure may include a chassis configured to at least partially define a passenger region sized for a child, a lower surface of the chassis defining a lower plane, a gearbox coupled to the chassis, and an electric motor coupled to the gearbox. The gearbox may be configured to selectively move with respect to the chassis, along a path of movement, from a storage configuration to an operating configuration. A greater portion of the gearbox may extend beneath the lower plane when the gearbox is in the operating configuration than when the gearbox is in the storage configuration. The path of movement of the gearbox may be, for example, an arc and/or or a linear translation (e.g., a vertical linear translation from above the lower plane to beneath the lower plane).

In some embodiments, the gearbox may include an axle-receiving portion having a through-hole extending through the gearbox. The through-hole may have a diameter sized to accommodate an axle. When the gearbox is positioned in the storage configuration, the axle-receiving portion may be positioned above the lower plane such that the through-hole is at least partially obstructed by the chassis in the storage configuration (e.g., the chassis may at least partially block the through-hole such that an axle may be prevented from being inserted through the through-hole while the gearbox is in the storage configuration). When the gearbox is positioned in the operating configuration, at least a portion of the gearbox may be positioned beneath the lower plane, such that the axle-receiving portion is configured to receive an axle through the through-hole (e.g., an axle may be inserted through the through-hole once the gearbox is positioned in the operating configuration and the chassis is no longer obstructing the through-hole).

Likewise, the chassis may include an axle passage configured to receive an axle therethrough. In the storage configuration, at least a portion of the gearbox may be positioned to obstruct the axle passage such that an axle cannot be inserted therethrough. By contrast, in the operating configuration, the axle passage may be concentrically aligned with the through-hole of the axle-receiving portion of the gearbox, thereby allowing insertion of an axle through the axle passage and the through-hole of the gearbox. In order to assemble the shipped chassis assembly for use by a child rider, an axle may be extended through the gearbox through-hole and the chassis axle passage. In some embodiments, the axle may be configured to retain the gearbox in the operating configuration and prevent movement of the gearbox to the storage configuration (e.g., once an axle is inserted through the axle passage and through-hole, the axle can effectively hold the gearbox in place in the operating configuration and restrict movement of the gearbox from the operating configuration to the storage configuration).

The chassis also may include a channel configured to receive at least a portion of the gearbox. The channel also may be configured to define the path of movement of the gearbox. For example, the gearbox may at least partially sit within or be at least partially housed within the chassis channel, and the gearbox may be configured to move within the channel. As further examples, the gearbox may slide up and down within the channel from the storage configuration to the operating configuration, the channel may guide the movement of the gearbox, and/or the channel may restrict the gearbox from moving in any direction other than between the storage configuration and the operating configuration.

In some embodiments, the channel may include an opening facing away from the lower plane of the chassis (e.g., facing upwards; open from the top), wherein the opening is defined by an inboard portion facing an interior space of the chassis. The inboard portion may include a cut-out (e.g., an upward-facing semi-circular region) that is sized to receive at least a portion of the electric motor (e.g., having a cut-out diameter that is greater than a motor diameter of the electric motor). In these embodiments, in the storage configuration, the gearbox may be positioned at least partially within the channel such that the electric motor is spaced apart from the cut-out by a first distance (e.g., the gearbox may be at a "higher" position within the channel such that the electric motor coupled to the gearbox is spaced a first distance away from the cut-out formed in the channel).

Moving the gearbox to the operating configuration also may move the electric motor along with the gearbox, such as by moving the electric motor towards and, in some examples, at least partially within, the cut-out formed in the channel. In some embodiments, the cut-out may be sized and positioned to accommodate the electric motor and allow the gearbox to move a greater distance down into the channel than would be possible without the cut-out. In some embodiments, the electric motor may still be spaced apart from the cut-out by a small distance such that the motor is substantially not in contact with the channel or cut-out, even in the operating configuration, when the ride-on vehicle is stationary (e.g., vibrations or bumps or movement of the ride-on vehicle may result in momentary contact between the motor and the channel or cut-out portion, but the cut-out may generally be at least a small distance away). Thus, in the operating configuration, the gearbox may be positioned at least partially within the channel such that the electric motor is spaced apart from the cut-out by a second distance, the second distance being smaller than the first distance.

In some embodiments, the channel may include one or more slots formed in the channel, the slots being configured to define the range of motion of the gearbox within and/or relative to the channel. For example, a fastener secured to the gearbox may extend through the slot and may permit movement of the gearbox within the channel to the extent that the fastener can move back and forth along the slot. The fastener may be configured to selectively secure the gearbox in at least one of: the storage configuration and the operating configuration. In some embodiments, the fastener may be configured to selectively be secured to retain the gearbox in the storage configuration for shipment, be unsecured (e.g., loosened, removed, etc.) to allow movement of the gearbox to the operating configuration, and/or be re-secured once the gearbox is moved to the operating configuration to assist in retaining the gearbox in the operating configuration.

In some embodiments, a chassis assembly can include a chassis cut-out that is sized and shaped to receive a corresponding structure of the gearbox, and the corresponding structure may contact the chassis cut-out in the operating configuration.

In some embodiments, the chassis assembly may include two electric motors (e.g., a first electric motor and a second electric motor) and two gearboxes (e.g., a first gearbox and a second gearbox) each having a through-hole (e.g., a first through-hole formed in the first gearbox and a second through-hole formed in the second gearbox). The first electric motor may be coupled to the first gearbox, and the second electric motor may be coupled to the second gearbox. The chassis may likewise include a first axle passage formed in a first side of the chassis and a second axle passage formed in a second side of the chassis.

A children's ride-on vehicle according to the present disclosure may include a chassis assembly as disclosed herein, in combination with an axle extending through the first through-hole of the first gearbox, the first axle passage of the chassis, the second through-hole of the second gearbox, and the second axle passage of the chassis. The children's ride-on vehicle may additionally include a first drive wheel rotatably coupled to the chassis and coupled to the first gearbox via the axle, and a second drive wheel rotatably coupled to the chassis and coupled to the second gearbox via the axle. In some embodiments, the first and second drive wheels and the associated axle are not coupled to the chassis until after the first and second gearboxes are moved from the storage configuration to the operating configuration.

Disclosed children's ride-on vehicles also may include a battery assembly adapted to provide power to the electric motor, a body coupled to the chassis and including a seat sized for a child operator, and a steering assembly including a steering mechanism adapted to receive steering inputs from a child sitting on the seat.

Methods of configuring a children's ride-on vehicle for operation also are disclosed. In some embodiments, a children's ride-on vehicle having:

(i) a chassis defining a lower plane and at least partially defining a passenger region sized for a child, (ii) a gearbox coupled to the chassis, and (iii) an electric motor coupled to a gearbox, the gearbox being selectively positionable between a storage configuration and an operating configuration, wherein a greater portion of the gearbox extends beneath the lower plane in the operating configuration than in the storage configuration, may be configured for operation by moving the gearbox with respect to the chassis, along a path of movement defined by the chassis, from the storage configuration to the operating configuration, and inserting an axle through a through-hole in the gearbox and an axle passage formed in the chassis. A drive wheel may be coupled to the axle, and the gearbox can be configured to deliver power from the electric motor to the drive wheel.

In some methods, moving the gearbox from the storage configuration to the operating configuration may include concentrically aligning the through-hole formed in the gearbox with the axle passage formed in the chassis. Inserting the axle through the through-hole and the axle passage may occur after the moving the gearbox from the storage configuration to the operating configuration. In some methods, moving the gearbox may include performing a translation, and optionally a linear translation, of the gearbox with respect to the chassis.

Some disclosed methods involve a chassis that includes a channel configured to at least partially house the gearbox, the channel having a channel cut-out sized to at least partially receive the electric motor. In such methods, moving the gearbox may include moving the gearbox such that, in the storage configuration, the electric motor is spaced a first distance from the channel cut-out, and in the operating configuration, the electric motor is spaced a second distance from the channel cut-out, the second distance being smaller than the first distance.

Some methods include unsecuring a fastener coupled to the gearbox and to the channel, the fastener being functional to retain the gearbox in the storage configuration when secured, such that unsecuring the fastener releases the gearbox to slide with respect to the channel. The fastener may be re-secured, thereby again securing the gearbox to the channel in the operating configuration. In such methods, re-securing the gearbox may be performed after moving the gearbox from the storage configuration to the operating configuration.

In some methods, a first electric motor may be coupled to a first gearbox, a second electric motor may be coupled to a second gearbox, and moving the gearbox with respect to the chassis may include moving the first gearbox with respect to the chassis and moving the second gearbox with respect to the chassis. Further, inserting the axle may include inserting the axle through a first through-hole in the first gearbox, a second through-hole in the second gearbox, a first axle passage formed in the chassis, and a second axle passage formed in the chassis. In some methods, insertion of the axle may retain the first and second gearboxes in the operating configuration (e.g., inserting the axle through the through-hole and axle passage may restrict movement of the gearbox towards the storage configuration.)

BRIEF DESCRIPTION OF THE DRAWINGS

FIG. 3 is a perspective view of a chassis assembly in a storage configuration according to the present disclosure.

FIG. 4 is a perspective view of a chassis assembly in an operating configuration according to the present disclosure.

FIG. 5 is an interior, partial elevation view of the chassis assembly of FIG. 3, showing a gearbox coupled to a chassis in a storage configuration, according to the present disclosure.

FIG. 6 is an exterior elevation view of the gearbox and chassis of FIG. 5.

FIG. 7 is a partial section view taken along line 7-7 of the chassis assembly of FIG. 3.

FIG. 8 is an exterior, partial elevation view of the chassis assembly of FIG. 4, showing a gearbox coupled to a chassis in an operating configuration, according to the present disclosure.

FIG. 9 is an exterior perspective view of the gearbox and chassis of FIG. 8.

FIG. 10 is a partial section view taken along line 10-10 of the chassis assembly of FIG. 4, along with a wheel coupled to the gearbox.

DESCRIPTION

Figure 1:
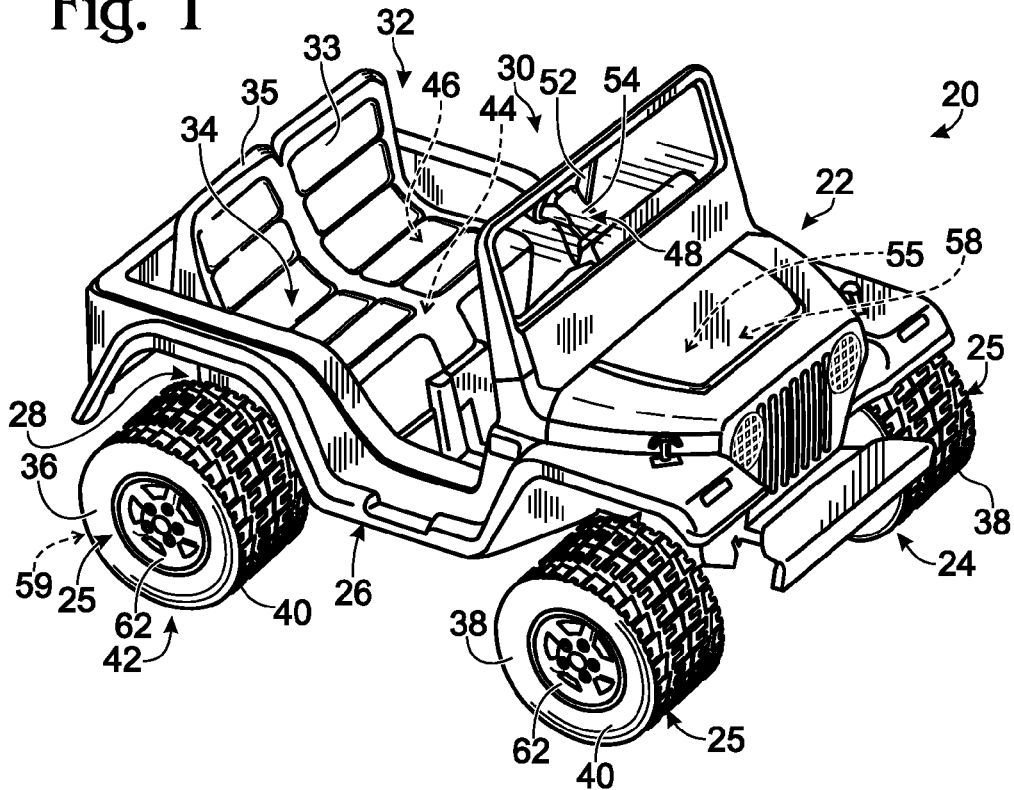
FIG. 1 is a perspective view of a children's ride-on vehicle that may include a chassis assembly according to the present disclosure.

FIGS. 1-10 illustrate children's ride-on vehicles 20, chassis assemblies 28, and elements thereof according to the present disclosure. Elements that serve a similar, or at least substantially similar, purpose are labeled with numbers consistent among the figures. Like numbers in each of FIGS. 1-10, and the corresponding elements, may not be discussed in detail herein with reference to each of FIGS. 1-10. Similarly, all elements may not be labeled in each of FIGS. 1-10, but reference numerals associated therewith may be used for consistency. Elements, components, and/or features that are discussed with reference to one or more of FIGS. 1-10 may be included in and/or used with any of FIGS. 1-10 without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

An illustrative, non-exclusive example of a children's ride-on vehicle that may include a chassis assembly 28 according to the present disclosure is shown in FIG. 1 and indicated generally at 20. Ride-on vehicle 20 includes a support frame, or body, 22 that provides a riding space, or passenger compartment, 32 with a seat assembly 34 that is sized and configured to accommodate at least one child, including a child driver. Seat assembly 34 may be integral with or otherwise mounted on body 22 and may have any suitable configuration, including configurations in which the position of the seat assembly is adjustable within the passenger compartment, and configurations in which the seat assembly includes two or more seats or two or more seating regions. Typically, vehicle 20 will be sized for use by a child driver or by a child driver and a child passenger. For example, in the illustrated embodiment, seat assembly 34 includes a pair of seats, or seating regions, 33 and 35, with seat 33 sized and positioned to receive a child driver and seat 35 sized and positioned to receive a child passenger.

Body 22 typically is formed, at least in part, from molded plastic and may be integrally formed or formed from a plurality of parts that are secured together by screws, bolts, clips or other suitable fasteners. Body 22 may additionally, or alternatively, be at least partially formed from other suitable material(s), such as metal, wood, or composite materials. Body 22 may include, or be mounted upon, an underlying chassis 26, on which the rest of the body 22 (which may be referred to as a body portion) is supported. Chassis 26 additionally or alternatively may be referred to herein as a chassis portion 26, and/or a frame 26. The chassis portion 26 may be formed from the same or different materials as the rest of the body 22; when present, the chassis portion 26 is often formed of metal and/or molded plastic, with the body portion 22 typically being formed of molded plastic. However, these illustrative examples of suitable materials of construction are not required. As discussed in more detail herein, chassis 26 may form a portion of a chassis assembly 28, which also includes a gearbox assembly 59 with at least one gearbox.

As shown, body 22 is shaped to generally resemble a reduced-scale Jeep® vehicle. JEEP is a registered trademark of the Daimler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it also is within the scope of the present disclosure that vehicle 20 may be shaped to resemble fantasy vehicles that do not have a corresponding adult-sized counterpart. Although vehicle 20 is depicted in the form of a reduced-scale Jeep® vehicle, it will be appreciated that the components and/or features of vehicle 20 may be configured for use on any type of children's ride-on vehicle.

Vehicle 20 also includes a plurality of wheels 25 that are rotatably coupled to body 22 and/or chassis 26, as indicated in FIG. 1. The plurality of wheels 25 includes a steerable wheel assembly 24 that contains at least one steerable wheel that is adapted to be steered by the vehicle's steering assembly 30, typically at least partially in response to user-imparted steering inputs thereto. The plurality of wheels further includes a driven wheel assembly 42 that contains at least one driven wheel that is adapted to be rotationally driven by the vehicle's drive assembly 44. As used herein, the term "driven wheel" refers to a wheel that is rotated in direct response to a rotational input from the vehicle's drive assembly 44, which is conveyed through a gearbox and axle.

In the illustrated embodiment, vehicle 20 includes four wheels 25, with front wheels 38 forming steerable wheel assembly 24, and rear wheels 36 forming driven wheel assembly 42. The number of wheels on the vehicle may vary from two wheels to three, four, six, or more wheels. However, children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 38 or rear wheels 36 are driven and steerable. Similarly, one front wheel 38 and one rear wheel 36 may be driven and/or steerable, or the vehicle 20 may include one or more driven or steerable wheels underneath its body that are generally hidden by the body of the vehicle. Illustrative examples of suitable wheels are disclosed in U.S. Pat. Nos. 7,621,543 and 7,905,305, the disclosures of which are hereby incorporated by reference.

Some or all of the plurality of wheels 25 may include a hub portion 62 and a tire portion 40, as indicated in FIG. 1. When present, the hub and tire portions may be integrally formed, or the hub and tire portions may be formed as separate parts that are secured together by screws, bolts, clips, adhesives, or other suitable fasteners or fastening methods. The hub and tire portions may be formed from the same or different materials. In some embodiments, hub portion 62 and tire portion 40 may be formed from materials having different colors, such as differently colored plastics. For example, hub portion 62 may (but is not required to) be formed from a silver-colored plastic to simulate a metal hub, while tire portion 40 may (but is not required to) be formed from a black-colored plastic to simulate a rubber tire. In some embodiments, the tire portion may be formed from rubber and/or may include a tread surface that is formed at least in part from rubber.

A portion of the vehicle's steering assembly 30 is shown in FIG. 1 and includes a steering column 54 and a steering mechanism 48. The steering assembly enables a child sitting on seat 33 to steer the vehicle's steerable wheel assembly 24 via user-applied steering inputs to steering mechanism 48, which is positioned on vehicle 20 for operation by a child sitting on seat 33. In the illustrated embodiment, steering mechanism 48 takes the form of a steering wheel 52. Other suitable structures, such as handlebars and steering levers may be used and are within the scope of the present disclosure. Steering column 54 includes any suitable mechanical linkage that conveys a child's steering inputs from the steering mechanism to the vehicle's steerable wheel assembly 24, thereby steering the vehicle.

Figure 2:
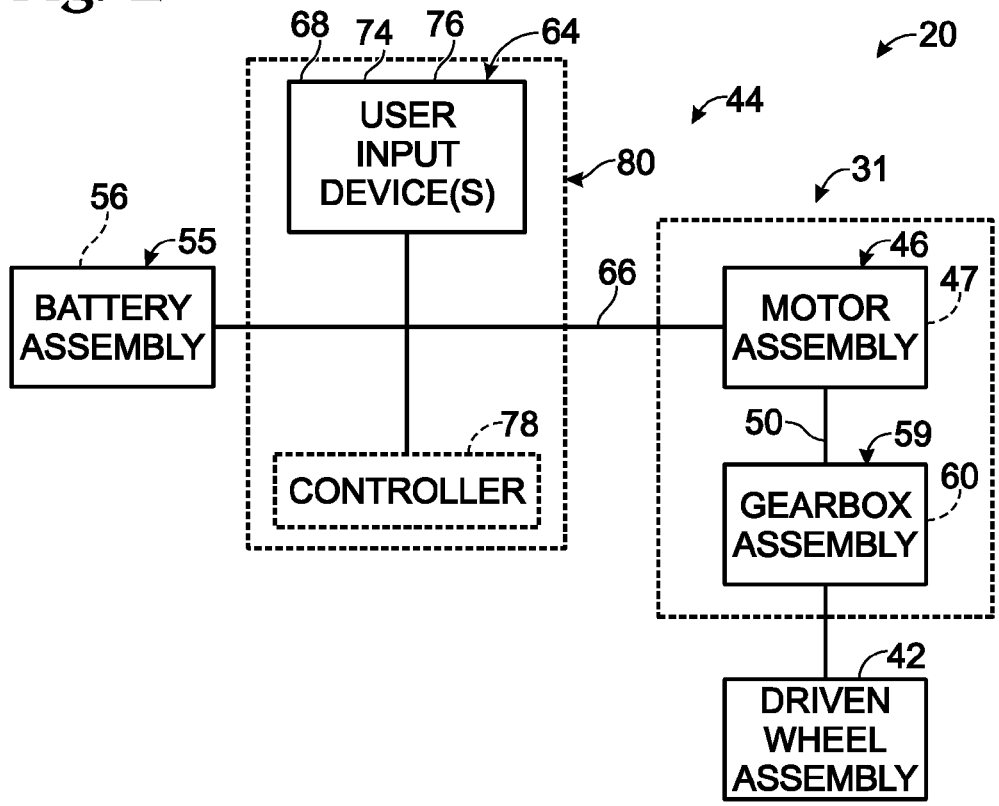
FIG. 2 is a non-exclusive, illustrative, schematic diagram of a suitable drive assembly for a children's ride-on vehicle, such as the vehicle of FIG. 1.

In FIG. 2, an illustrative, non-exclusive example of a suitable drive assembly 44 for a children's ride-on vehicle, such as vehicle 20, is schematically illustrated. Drive assembly 44 is adapted to drive the rotation of driven wheel assembly 42. The drive assembly 44 may be referred to as a motorized drive assembly 31 and includes a motor assembly 46, which includes at least one electric motor 47, that is adapted to drive the rotation of at least one of the plurality of wheels. Illustrative examples of suitable motor assemblies are disclosed in U.S. Pat. No. 7,413,041, the disclosure of which is hereby incorporated by reference. The motor assembly 46 includes an output 50 that provides a rotational input to the driven wheel assembly 42, such as to the hub portion of one or more of the wheels 25 in driven wheel assembly 42. Typically, the output 50 from each of the at least one motors includes a rotating shaft and/or a rotating pinion or output gear. Output 50 may include more than one shaft, pinion, and/or gear, such as when motor assembly 46 includes more than one motor and/or when driven wheel assembly 42 includes more than one driven wheel. Motor assembly 46 may also be configured to power other moveable components on vehicle 20, such as depending on the form of the vehicle. For example, the motor assembly 46 may be coupled to raise and lower the blade of a ride-on that resembles a bulldozer, the bucket of a ride-on that resembles a skid-steer or other loader, the bed of a ride-on that resembles a dump truck, etc.

Power for the motor assembly 46 may be provided by battery assembly 55. Illustrative examples of suitable battery assemblies are disclosed in U.S. Pat. No. 6,509,719, the disclosure of which is incorporated herein by reference. Battery assembly 55 includes at least one battery, or cell, 56 that is adapted to provide power to the motor assembly. When powered by battery assembly 55, motor assembly 46 and/or motor(s) 47 thereof may be referred to as a battery-powered motor assembly 46 and/or a battery-powered motor 47, respectively. The batteries may be rechargeable batteries. The batteries in battery assembly 55 may be configured to be selectively disconnected from the motor assembly and connected to a charging assembly to recharge the batteries. Any suitable type and number of batteries, or cells, may be used in battery assembly 55. For example, one or more six-, twelve-, eighteen-, or twenty-four-volt batteries have proven effective. The motor assembly 46 may be operably connected to the battery assembly 55 by any suitable electrical connectors, such as cables, wires, positive and negative terminals or leads, one or more plugs and corresponding sockets, and the like.

In FIG. 2, drive assembly 31 is shown further including a gearbox assembly 59 that mechanically interconnects the motor assembly 46 with the driven wheel assembly 42. Gearbox assembly 59 is any suitable mechanism, or series of mechanisms and/or elements, that transmits the rotational input from an output of the motor assembly to the at least one driven wheel of the driven wheel assembly 42, such as to the hub portion of one or more of the wheels 25 in driven wheel assembly 42. Gearbox assembly 59 may include at least one gearbox 60. Gearbox 60 may contain one or more gears, a belt or chain drive, a worm gear, one or more individual gears, and the like. Gearbox 60 may be adapted to transmit the rotational input from the output 50 to a driven wheel of the driven wheel assembly 42 at the same relative rate of rotation, or it may mechanically augment the rotational input to convey a greater or lesser rate of rotation relative to the rate of rotation of the output 50. Gearbox assembly 59 and motor assembly 46 may be coupled together, as shown schematically in FIG. 2. For example, a motor 47 of motor assembly 46 may be coupled to a gearbox 60 of gearbox assembly 59, optionally for movement with the gearbox relative to the chassis of a children's ride-on vehicle. Other configurations, including relative numbers and couplings of motors and/or gearboxes may be used and are within the scope of the present disclosure. Accordingly, references herein to a gearbox 60 additionally or alternatively may be to each gearbox of gearbox assembly 59 and/or to gearbox assembly 59 generally.

As schematically illustrated in FIG. 2, drive assembly 31 also may include one or more user input devices 64 that are adapted to convey inputs from a child sitting on seat 33 to the drive assembly. User input devices 64 also may be referred to as user control devices. These devices convey a user's inputs, such as via the vehicle's wiring harness 66, and affect the actuation of the motor assembly 46, such as by causing the actuation (or energization) of the motor assembly 46, selecting between a range of electronic configurations, selecting the direction of rotation of the motor assembly's output 50, selecting the relative degree of a maximum rate of rotation to which motor assembly 46 is actuated, etc. Examples of suitable user input devices 64 include a drive actuator 68, through which a user input directing the battery assembly 55 to energize the motor assembly 46 is received. Examples of suitable drive actuators 68 include an on/off switch, a foot pedal, a throttle lever, and a rotational handgrip on a steering mechanism that includes a handlebar. When drive actuator 68 takes a form other than a foot pedal, it may be located in any suitable location within or near passenger compartment 32 so that a child sitting on seat 33 may reach the actuator while positioned to operate vehicle 20. For example, an on/off switch or throttle may be located on the body or on the steering mechanism 48.

As schematically illustrated in FIG. 2, other examples of user input devices 64 include a speed switch 74, which enables a user to select the relative rate of rotation of the motor assembly's output 50, and a direction switch 76, which enables a user to select the relative direction (i.e., clockwise or counterclockwise) of rotation of output 50 and thereby configure the vehicle 20 to drive in forward and reverse directions. Switches 74 and 76 may be located in any suitable location on body 22 or steering mechanism 48 for actuation by a child sitting on seat 33. An example of a suitable speed switch 74 is a switch that selectively configures a pair of batteries between series and parallel configurations to define relative "high" and "low" speed configurations. Speed switch 74 may additionally or alternatively selectively configure a pair of motors between series and parallel configurations. As a further example, the switches may convey inputs to a controller, such as subsequently described controller 78, which, responsive to inputs from the switches, configures vehicle 20 for a selected operating state.

As illustrated in FIG. 2, drive assembly 31 may (but is not required to) further include a controller 78, which is adapted to control electronically the transmission of the rotational input from the motor assembly 46 to the driven wheel assembly 42. More specifically, controller 78 may include a microprocessor or suitable control circuit that is adapted to control the actuation, or energization, of the motor assembly 46 by the battery assembly 55 to regulate electronically the rotational input transmitted by the motor assembly 46 to the driven wheel assembly 42. Controller 78 may regulate at least one of the timing and the ramp, or rate, of application of the transmission of the rotational input after actuation of a corresponding user input device 64 by a child sitting on seat 33. In other words, the controller 78 may delay in at least time and/or rate of transmission the rotational input to the driven wheel assembly 42 responsive at least in part to a user input selecting the desired, or selected, rotational input. An illustrative example of a suitable controller is disclosed in U.S. Pat. No. 6,771,034, the disclosure of which is hereby incorporated by reference. As used herein, the one or more user input devices 64 and, when present, controller 78 that are adapted to configure the vehicle's drive assembly 31 between a plurality of operating states may be referred to collectively as the vehicle's speed control assembly 80.

As shown in FIG. 1, body 22 may also include at least one battery compartment 58 that is adapted to receive battery assembly 55. The battery compartment may take any of a variety of different shapes, sizes, and configurations depending on such factors as the form of vehicle 20, the portion of the vehicle's body within which the compartment is formed, and the size and shape of battery assembly 55. The battery compartment 58 may include a cover or other closure to selectively restrict access to the battery assembly 55 during use of the vehicle. The compartment may additionally or alternatively include a suitable retainer to position and/or secure the battery assembly 55 within the battery compartment 58.

Now with reference to FIGS. 3 and 4, according to the present disclosure, embodiments of chassis assemblies 28 for children's ride-on vehicles may include a chassis 26 and a gearbox assembly 59. Gearbox assembly 59 includes at least one gearbox 60 that is selectively repositionable (e.g., movable) with respect to the chassis 26 from a storage configuration (FIG. 3) to an operating configuration (FIG. 4). Some embodiments of the disclosed chassis assemblies 28 and/or corresponding children's ride-on vehicles can reduce the packaging size associated with shipment of a children's ride-on vehicle and/or may also reduce the risk of improper assembly. This contrasts with many conventional chassis assemblies for children's ride-on vehicles, such as which rely on the user to properly position and install the gearbox(es) to the chassis and/or which include gearboxes that are installed in operating (and thus extended or projecting) configurations prior to packaging of the chassis assembly for shipment.

Generally, the vehicle chassis 26 can be configured so that one or more motors 47 and gearboxes 60 to be associated with one or more driven wheels may be selectively positioned between a storage configuration (FIG. 3), or storage position (also referred to herein as a shipping configuration, or a retracted configuration), and an operating configuration (also referred to herein as a deployed, or extended configuration), as shown in FIG. 4. For example, in the storage configuration, the gearboxes 60 may be retained in a position that allows for shallower packaging to be used than otherwise would be possible if the vehicles were shipped with gearboxes 60 in their operating configuration. Also, shipping the vehicles partially assembled in the storage configurations can help to ensure that the gearboxes 60 are protected from damage during transport of the packaged (and incompletely assembled) children's ride-on vehicle.

As shown in FIGS. 3-4, some embodiments of a chassis assembly 28 for a children's ride-on vehicle may include a chassis 26 configured to at least partially define a passenger region 32 sized for a child. Chassis 26 may have a lower surface 102 that defines a lower plane 104. As shown in FIG. 3, chassis assembly 28 may be configured for shipping (e.g., in a storage configuration), and may be partially assembled (e.g., may be separate from a body, one or more axles, and/or wheels that may make up the children's ride-on vehicle). One or more gearboxes 60 may be coupled to the chassis, and an electric motor 47 may be coupled to each gearbox 60. In some embodiments, as shown in FIG. 3, the chassis assembly 28 may include two gearboxes 60 and two electric motors 47, corresponding to two driven wheels to be attached once the gearboxes are moved to the operating configuration. The gearboxes 60 may be positioned on opposing sides of the chassis 26, with the electric motors 47 facing the interior of the chassis 26. In other embodiments, more or fewer gearboxes 60 and/or electric motors 47 may be included and/or otherwise utilized.

In the storage configuration of FIG. 3, the gearboxes 60 may be positioned such that they do not extend beneath the lower surface 102 of chassis 26 (e.g., the gearboxes may be positioned so that they do not cross the lower plane 104, and thus do not affect (e.g., increase) the overall profile (e.g., overall height) of the chassis assembly 28). In other embodiments, a portion of the gearbox 60 may extend beyond the lower surface 102 of the chassis 26 in the storage configuration.

Gearbox assembly 59 and/or the one or more gearboxes 60 thereof may be configured to be selectively moveable with respect to the chassis 26, along a path of movement, from the storage configuration of FIG. 3 to the operating configuration of FIG. 4. In some embodiments, gearbox 60 can be configured for movement with respect to the chassis 26, such as along the defined path of movement, without requiring movement of other components of the chassis. In some embodiments, an electric motor 47 is coupled to each gearbox 60 and thus may move with the gearbox 60 with respect to the chassis 26. Such movement may be performed without requiring changes to, or disassembly of, the chassis 26 (e.g., without requiring one or more portions of the chassis to be moved, opened, rotated, swiveled, hinged, or the like to permit movement of the gearbox 60 and electric motor 47). In some embodiments, and as will be described further in connection with FIGS. 5 and 7, one or more fasteners may optionally be utilized to retain the gearbox in the storage configuration and prevent unwanted or unintentional movement towards the operating configuration (e.g., during shipping). Additionally or alternatively, one or more fasteners may optionally be utilized to retain the gearbox in the operating configuration and prevent unwanted or unintentional movement towards the storage configuration.

Turning now to FIG. 4, in the operating configuration, a greater portion of the gearbox 60 may extend beneath the lower plane 104 than when the gearbox 60 is in the storage configuration (FIG. 3). For example, in the operating configuration, and as shown in FIG. 4, at least a portion of the gearbox 60 may extend beneath the lower surface 102 of chassis 26, thereby breaking (i.e., extending through and beneath) the plane 104, as contrasted with the embodiment shown in FIG. 3, where the gearbox 60 does not extend beneath lower plane 104. In some embodiments, a small portion of the gearbox may extend beneath the lower surface of the chassis in the storage configuration, and a greater portion of the gearbox may extend beneath the lower surface of the chassis in the operating configuration.

In being moved from the storage configuration to the operating configuration, the gearboxes 60 may be moved along a path of movement defined by chassis 26 (e.g., a path of movement as indicated by arrow 108). The path of movement of the gearbox 60 may be, for example, an arc, a linear translation (e.g., a horizontal, vertical, or diagonal translation), an irregular movement, a sinusoidal movement, a three-dimensional movement, a two-dimensional movement, a circular or polygonal movement, a rotation, and/or a compound movement (e.g., a combination of one or more movements). In the embodiment shown in FIGS. 3-4, the path of movement of the gearboxes 60 may be a substantially vertical linear translation from above lower plane 104 to beneath lower plane 104 (e.g., the entirety of the gearbox 60 may be positioned above the lower plane 104 in FIG. 3, and a portion of the gearbox may be positioned beneath the lower plane in FIG. 4). In these and other embodiments, the path of movement of the gearboxes 60 may be a linear translation (or other path of movement) resulting in a greater portion of the gearbox 60 being positioned beneath the lower plane 104 in the operating configuration than in the storage configuration. In other words, a "greater portion" can refer both to embodiments of a gearbox being entirely above the lower plane 104 in the storage configuration (e.g., moving from none of the gearbox being positioned below the lower plane of the chassis to a portion of the gearbox being positioned below the lower plane) and also to embodiments where a portion of the gearbox 60 is positioned beneath the lower plane even in the storage configuration (e.g., moving the gearbox from a non-zero, initial portion being beneath the lower plane to a greater portion than the initial portion being beneath the lower plane).

In some embodiments, the gearbox 60 may include an axle-receiving portion 110 having a through-hole 112 extending through the gearbox 60, such as is indicated in FIG. 3 and through which axle 116 extends in FIG. 4. Through-hole 112 may have a diameter sized to accommodate an axle (e.g., the through-hole can be sized to receive an axle that may be used to couple one or more wheels to the children's ride-on vehicle). As best seen in FIGS. 5-7, when gearbox 60 is positioned in the storage configuration, axle-receiving portion 110 may be positioned above lower plane 104 such that through-hole 112 is at least partially obstructed by chassis 26 in the storage configuration (e.g., chassis 26 may at least partially block through-hole 112 such that an axle may be prevented from being inserted through through-hole 112 while gearbox 60 is in the storage configuration, as perhaps best seen in FIG. 6).

By contrast, when gearbox 60 is positioned in the operating configuration, at least a portion of gearbox 60 may be positioned beneath lower surface 102 of chassis 26 and therefore beneath lower plane 104. For example, lower portion 114 of gearbox 60 may be positioned beneath lower plane 104, as seen in FIG. 8-10. Furthermore, the gearbox may be positioned such that axle-receiving portion 110 is configured to receive an axle 116 through through-hole 112. For example, an axle 116 may be inserted through through-hole 112 once gearbox 60 is positioned in the operating configuration and chassis 26 is no longer obstructing through-hole 112.

Chassis 26 may include one or more axle passages 118 configured to receive an axle 116 therethrough. In the storage configuration (FIGS. 3 and 5-7), at least a portion of gearbox 60 may be positioned to obstruct axle passage 118 such that an axle 116 cannot be inserted therethrough. For example, and as best seen in FIGS. 5 and 7, lower portion 114 of gearbox 60 may be positioned to at least partially block axle passage 118 in order to prevent an axle from being inserted therethrough while gearbox 60 is in the storage configuration. In some embodiments, gearbox 60 (e.g., lower portion 114 of gearbox 60, or any other portion of gearbox 60) may partially block axle passage 118, such that axle passage 118 is not entirely obstructed, but is blocked enough to prevent insertion of an axle therethrough. In other embodiments, gearbox 60 (e.g., lower portion 114 of gearbox 60, or any other portion of gearbox 60) may entirely block or obstruct axle passage 118, thereby preventing an axle from being inserted therethrough. This configuration may, in some embodiments, prevent a chassis assembly from being shipped with one or more axles pre-attached or pre-coupled to the chassis. In some embodiments, a chassis assembly may be shipped in a storage configuration with no axles inserted or coupled to the chassis. In some embodiments, a chassis assembly may be shipped in a storage configuration with one axle coupled to the chassis. For example, front axle 106 may be coupled to chassis 26 prior to shipping (e.g., while in the storage configuration), as shown in FIG. 3. In other embodiments, front axle 106 may be coupled to chassis 26 after shipping, either while chassis assembly 28 is still in the storage configuration, or once chassis assembly 28 has been put into the operating configuration.

As discussed, one or more axle passages 118 formed in chassis 26 may be obstructed by a gearbox 60 when the gearbox is in the storage configuration. In contrast, in the operating configuration (FIGS. 4 and 8-10), and as indicated in FIG. 8, axle passage 118 may be at least substantially concentrically aligned with through-hole 112 of axle-receiving portion 110 of gearbox 60, thereby allowing insertion of an axle 116 (FIGS. 4 and 9-10) through axle passage 118 of chassis 26 and through through-hole 112 of gearbox 60. In some embodiments, a single axle 116 may extend through more than one through-hole 112 and more than one axle passage 118. For example, chassis assembly 28 may include two moveable gearboxes 60. Each gearbox 60 may include a through-hole 112, and chassis 26 may include two axles passages 118 on opposing sides of chassis 26 (e.g., a first axle passage formed through the left side 120 of chassis 26, and a second axle passage formed through the right side 122 of chassis 26). Furthermore, each axle passage 118 may be positioned adjacent a gearbox 60. In some embodiments, a single axle 116 may be inserted through both axle passages 118 of chassis 26 and through the through-hole 112 of each gearbox 60. In some embodiments, a separate axle may be provided for each gearbox 60. For example, a first axle may be inserted through the through-hole of a first gearbox and adjacent first axle passage 118 on the left side 120 of chassis 26, and a second axle may be inserted through the through-hole of a second gearbox and adjacent second axle passage 118 on the right side 122 of chassis 26.

In some embodiments, the axle 116 may be configured to retain one or more gearboxes 60 in the operating configuration and prevent movement of gearbox 60 to the storage configuration. For example, once an axle 116 is inserted through the axle passage 118 and through-hole 112, the axle 116 can effectively hold or otherwise retain the gearbox 60 in place in the operating configuration. Although not required to all embodiments, a single axle 116 may retain more than one gearbox 60 (e.g., both gearboxes 60 shown in FIG. 4) in the operating configuration once inserted through the through-hole 112 of each gearbox 60 desired to be retained. For example, because the axle 116 can be inserted through both a through-hole 112 of a gearbox 60 and an axle passage 118 formed in the chassis 26, once an axle 116 in inserted through both, the gearbox 60 may be prevented from moving with respect to the chassis 26 because the axle 116 can force the through-hole 112 of gearbox 60 to remain concentrically aligned with the axle passage 118 of the chassis 26, thereby preventing movement of the gearbox 60 with respect to chassis 26.

As noted above, the gearbox (e.g., one or both of the gearboxes 60 shown in FIGS. 3-4) can be moved along a path of movement defined by the chassis as it is moved from the storage configuration to the operating configuration. For example, the chassis 26 may include a channel 124 configured to receive at least a portion of the gearbox 60. Channel 124 also may be considered a housing 124, a gearbox-receiving portion 124, and/or a compartment 124. As perhaps best seen in FIGS. 3-5 and 8, channel 124 may house at least a portion of gearbox 60, and channel 124 may be sized to allow movement of the gearbox 60 within channel 124. In some embodiments, the entire gearbox 60 may sit within, or be housed by, channel 124; in other embodiments, just a portion of gearbox 60 may be contained within channel 124. Channel 124 may include an upper opening 132, facing away from lower plane 104. An upper gearbox portion 140 of gearbox 60 may extend past upper opening 132 and out of channel 124 in the interior of chassis 26, as perhaps best seen in FIGS. 3-5 and 8.

Additionally or alternatively, channel 124 may include an exterior opening 138 that opens to a space external to chassis 26. An external gearbox portion 142 may extend past, or through, exterior opening 138, such that the external gearbox portion 142 extends externally to chassis 26 in order to receive a wheel 25 (FIG. 10). For example, and perhaps as best seen in FIGS. 3-4, 6, and 9, external gearbox portion 142 is shown extending outward from an outer surface 144 of chassis 26. As used herein, a portion of the gearbox 60 is considered to be contained within, received by, or housed by channel 124 if the portion of the gearbox 60 is positioned in the space formed between the chassis 26 and channel plate 126, regardless of whether any of the gearbox extends through or past upper channel opening 132 and/or exterior channel opening 138. In other words, a portion of the gearbox may be located "outside" the channel 124 and yet the gearbox may still be moved and/or contained "within" the channel according to the present disclosure. Furthermore, because channel 124 is formed integrally with chassis 26 or is coupled thereto, moving a gearbox with respect to channel 124 or moving a gearbox back and forth within the channel also constitutes moving the gearbox with respect to the chassis 26.

Channel 124 can be, for example, a C-channel 124 formed on or within chassis 26. Channel 124 can be formed of the same material as chassis 26, or of a different material. In some embodiments, channel 124 can be formed by a C-shaped or bracket-shaped plate 126 (also referred to herein as a channel inboard portion 126) that is coupled to chassis 26, thereby forming, for example, a C-channel 124 between the C-shaped plate 126 and an inner surface 136 of the chassis 26, as best seen in FIGS. 3-4. An interior lip 128 formed in chassis 26 (FIGS. 5, 7-8, and 10) and interior to the C-shaped plate 126 (e.g., positioned closer to the interior of the chassis 26 than the plate 126) may help to reinforce and secure the plate 126 forming C-channel 124. An exterior lip 130 formed in chassis 26 (FIGS. 6-7 and 9-10) may help define the channel 124 and also form the extent to which the gearbox 60 can be lowered within the channel 124, as best seen in FIG. 10, where an inner lower portion 134 of gearbox 60 is shown contacting the exterior lip 130 in the operating configuration.

Chassis assemblies according to the present disclosure can include one or more channels 124. In some embodiments, a chassis assembly can include a respective channel for each gearbox. For example, as shown in FIGS. 3-4, chassis assembly 28 includes two channels 124 (e.g., one channel 124 for each of the two gearboxes 60), a first channel 124 being formed in the left side 120 of chassis 26, and a second channel 124 being formed in the right side 122 of chassis 26. When more than one channel 124 is utilized, the channels may be aligned, parallel, and/or define parallel paths of movement for the corresponding gearboxes.

The portion of gearbox 60 that is contained within channel 124 may change as the gearbox 60 is moved from the storage configuration to the operating configuration (or vice versa). For example, more or less of the gearbox 60 may be contained within channel 124 in the storage configuration as compared to the operating configuration. In some embodiments, different portions of the gearbox 60 may be contained within channel 124 in the storage configuration as compared to the operating configuration. For example, comparing FIGS. 5 and 8, a first portion 146 of the gearbox 60 is positioned outside channel 124 (e.g., above upper channel opening 132) in the storage configuration of FIG. 5, and a second portion 148 that is smaller than the first portion 146 is positioned outside channel 124 in the operating configuration of FIG. 8. This change results in different portions of the gearbox being contained within the channel 124 in the storage configuration as compared to the operating configuration.

In some embodiments, channel 124 may substantially restrict movement of the gearbox to a single direction within channel 124. In other embodiments, channel 124 may permit movement of the gearbox in more than one direction, but may still otherwise limit or direct the movement of the gearbox 60 from the storage configuration to the operating configuration.

Channel 124 may be formed integrally with chassis 26 in some embodiments. In other embodiments, channel 124 may be formed separately from chassis 26 and coupled to chassis 26, such as by welding, adhesives, fasteners, and/or other suitable coupling methods.

The channel 124 may be configured to define the path of movement of the gearbox 60. For example, the gearbox 60 may at least partially sit within or be at least partially housed within the channel 124, and may be configured to move within the channel 124 (e.g., gearbox 60 may slide up and down within channel 124 from the storage configuration (FIGS. 5-7) to the operating configuration (FIGS. 8-10). Channel 124 may guide the movement of the gearbox 60, and/or substantially prevent gearbox 60 from moving in any direction other than back and forth between the storage configuration and the operating configuration.

As discussed above, in some embodiments, channel 124 may include an upper channel opening 132 facing away from the lower plane 104 of the chassis 26 (e.g., facing upwards; open from the top), wherein the opening 132 is defined by an inboard portion 126 facing an interior space of the chassis 26. The inboard portion 126 optionally may include a channel cut-out 150 (e.g., an upward-facing semi-circular region 150, best seen in FIGS. 5 and 8) that is sized to receive at least a portion of the electric motor 47 (e.g., having a cut-out diameter that is greater than a motor diameter of the electric motor 47). As shown in FIG. 8, the channel cut-out 150 can receive or contain at least a portion of the motor 47. In some embodiments, the channel cut-out 150 can accommodate the motor 47 to allow movement of the gearbox 60 within the channel 124 farther than would otherwise be permitted without the cut-out 150. In other words, in some embodiments, having a channel inboard portion 126 without a cut-out 150 may interfere with movement of the gearbox 60 within channel 124 due to the motor 47 hitting the channel inboard portion 126 and preventing further movement of the gearbox 60 deeper into the channel 124. In some embodiments, in the storage configuration, the gearbox 60 may be positioned at least partially within the channel such that the electric motor 47 is spaced apart from the cut-out 150 by a first distance 152, as best seen in FIGS. 5 and 7. For example, the gearbox may be at a "higher" position within the channel such that the electric motor 47 coupled to the gearbox 60 is spaced a first distance 152 away from the cut-out 150 formed in the channel inboard portion 126.

Moving the gearbox 60 to the operating configuration also can move the electric motor 47 along with the gearbox 60, such as by moving the electric motor 47 towards and, in some examples, at least partially within the cut-out 150 formed in the channel inboard portion 126. In other words, the cut-out 150 can be sized and positioned to accommodate the electric motor 47 and allow the gearbox 60 to move a greater distance down into the channel 124 than would be possible without the cut-out 150. In some embodiments, the electric motor 47 can still be spaced apart from the cut-out 150 by a small, second distance 154 in the operating configuration (FIGS. 8 and 10), where the second distance 154 is smaller than the first distance 152 between the motor 47 and channel cut-out 126 in the storage configuration. The second distance 154 can ensure that the motor 47 is substantially not in contact with the channel inboard portion 126 or channel cut-out 150, even in the operating configuration, when the ride-on vehicle is stationary. Vibrations or bumps or movement of the ride-on vehicle may result in momentary contact between the motor 47 and the channel inboard portion 126 or cut-out 150, but the cut-out 150 may generally be at least a small distance away (e.g., second distance 154). Thus, in the operating configuration, the gearbox 60 may be positioned at least partially within the channel 124 such that the electric motor 47 is spaced apart from the cut-out 150 by the second distance 154, the second distance 154 being smaller than the first distance 152.

In some embodiments, a chassis assembly 28 can include a chassis cut-out 156 sized and shaped to receive a corresponding structure 158 of the gearbox 60 (best seen in FIGS. 6 and 9), and the corresponding structure 158 may contact the chassis cut-out 156 in the storage configuration and/or operating configuration.

Channel inboard portions 126 may include one or more slots 162 cut through or formed in the channel inboard portion 126, as shown in FIGS. 5 and 8. Such slots 162 are optional, and may be oriented and shaped in any manner. Any number of slots 162 may be provided. Slots 162 may function to define the path of movement of the gearbox 60 within the channel 124 in some embodiments and/or may define the range of motion of the gearbox 60 within the channel 124. In some embodiments, slots 162 and the channel inboard portion 126 itself may both define the path of movement of the gearbox 60 within the channel 124. FIGS. 5 and 8 show two substantially vertically-oriented slots 162 that can, in some embodiments, define the path of movement and/or set the upper and lower limits for the movement of the gearbox 60 within the channel 124.

One or more fasteners 160 (FIG. 5) may be used to secure the gearbox 60 within the channel 124, selectively in the operating configuration or storage configuration, or somewhere therebetween. For example, one or more bolts secured to the gearbox 60 may extend through a slot 162 and be secured on the other side of the channel inboard portion 126 via nut 160. Unsecuring (e.g., loosening and/or removing) the nut 160 may permit the bolt to slide along the length of the slot 162, thereby allowing the gearbox to slide within the channel 124 in the direction defined by the slots 162. In some embodiments, the slots 162 can define the upper and or lower limits for movement of the gearbox 60 within channel 124. For example, as the bolt extending through the slot 162 reaches the upper end 164 of slot 162, it will prevent further movement in that direction of the gearbox 60 secured to that bolt. Similarly, as the gearbox is moved in the other direction and the bolt reaches the lower end 166 of slot 162, it will prevent further movement of the gearbox in that direction. Once the gearbox 60 has been repositioned to the desired position, the nut 160 can be resecured (e.g., tightened or re-placed on the bolt), thereby retaining the gearbox in the new position. As another example, fastener 160 may take the form of a screw that threadingly engages a hole, or socket, in the chassis. The fastener may be tightened or loosened to secure or unsecure the fastener, and thus restrict or permit movement of the gearbox within the channel, such as along the corresponding path of travel.

While the embodiments described above have been described primarily with reference to one gearbox and one motor, chassis assemblies 28 according to the present disclosure may include additional gearboxes and/or motors. When more than one gearbox and/or motor is utilized, all or a portion of the plurality of gearboxes and/or electric motors may be movable from a storage configuration to an operating configuration. For example, FIGS. 3 and 4 show a chassis assembly 28 having two gearboxes and two electric motors (e.g., one electric motor coupled to each gearbox). In some embodiments, both of the shown gearbox/motor assemblies may be movable from a storage configuration to an operating configuration according to the present disclosure. In some embodiments, just one of the gearboxes may be movable from a storage configuration to an operating configuration. Some embodiments of a chassis assembly may include more or fewer gearboxes and/or more or fewer motors. For example, a single motor may be associated with one or more gearboxes. In some embodiments, a chassis assembly may include more gearboxes, such as three or four gearboxes, some or all of which may include an electric motor coupled thereto. Some or all of the gearboxes may be movable in various embodiments and variations. For example, one example of a chassis assembly may include three or four gearboxes where all three or all four of the gearboxes are movable with respect to the chassis. Another example of a chassis assembly may include three or four gearboxes, with a subset of the gearboxes (e.g., two out of three, three out of four, one out of three, etc.) being selectively moveable from a storage configuration to an operating configuration and vice versa.

While the embodiments described above have generally been with reference to a specific example of a chassis assembly having four wheels, with two wheels in the front (here, the steerable wheels) and two wheels in the back (here, the driven wheels, e.g., the wheels rotatably coupled to the motor and gearbox), it is to be understood that other configurations are also possible. For example, in some embodiments, the front wheels may be the driven wheels and the rear wheels may be the steerable wheels. In some embodiments, there may be one front wheel and/or one rear wheel instead of two front wheels and two rear wheels. In some embodiments, there may be additional wheels (e.g., three or more front wheels and/or three or more rear wheels). Similarly, in some embodiments, one or more front wheels and/or one or more rear wheels may be driven wheels and/or steerable wheels.

Furthermore, while movement of the gearbox has generally been described as moving from the storage configuration to the operating configuration, some embodiments include moving the gearbox from the operating configuration back to the storage configuration. In some embodiments, the chassis assembly can be configured such that the gearbox is moveable just once, and once moved to the operating configuration cannot be moved back to the storage configuration. Alternatively, in other embodiments, the chassis assembly can be configured such that the gearbox is repeatedly moveable, back and forth as desired, between the storage configuration and the operating configuration and vice versa.

A children's ride-on vehicle according to the present disclosure can include a chassis assembly as disclosed herein, in combination with an axle extending through the first through-hole of the first gearbox, the first axle passage of the chassis, the second through-hole of the second gearbox, and the second axle passage of the chassis. The children's ride-on vehicle may additionally include a first drive wheel rotatably coupled to the chassis and coupled to the first gearbox via the axle and a second drive wheel rotatably coupled to the chassis and coupled to the second gearbox via the axle. In some embodiments, the first and second drive wheels and the associated axle are not coupled to the chassis until after the first and second gearboxes are moved from the storage configuration to the operating configuration.

Disclosed embodiments of a chassis assembly for a children's ride-on vehicle may be incorporated with additional components and parts to form a children's ride-on vehicle according to the present disclosure. For example, a chassis assembly may be combined with one or more axles, one or more wheels, a battery assembly adapted to provide power to the electric motor, a body coupled to the chassis and including a seat sized for a child operator, and a steering assembly including a steering mechanism adapted to receive steering inputs from a child sitting on the seat. A children's ride-on vehicle can thus be provided including a chassis assembly with one or more gearboxes that are selectively moveable relative to the chassis.

Methods of configuring a children's ride-on vehicle for operation also are disclosed. In some embodiments, a children's ride-on vehicle having (i) a chassis defining a lower plane and at least partially defining a passenger region sized for a child, (ii) a gearbox coupled to the chassis, and (iii) an electric motor coupled to a gearbox, the gearbox being selectively positionable between a storage configuration and an operating configuration, wherein a greater portion of the gearbox extends beneath the lower plane in the operating configuration than in the storage configuration, may be configured for operating by moving the gearbox with respect to the chassis, along a path of movement defined by the chassis, from the storage configuration to the operating configuration and inserting an axle through a through-hole in the gearbox and an axle passage formed in the chassis. A drive wheel can be coupled to the axle, and the gearbox can be configured to deliver power from the electric motor to the drive wheel.

For example, a chassis assembly according to the present disclosure may be configured for shipping by placing it into a storage configuration. In some embodiments, the storage configuration may involve a chassis assembly without wheels or axles yet attached thereto, where one or more gearboxes are positioned in a storage configuration. In some embodiments, the gearboxes may be positioned such that they do not extend beneath a lower plane defined by the lower surface of the chassis. In this manner, the chassis assembly can have a lower profile for shipping. Once it is desired to configure the chassis assembly for operation (e.g., after shipping, or once received by a user), the one or more gearboxes can be moved to an operating configuration and assembly of the children's ride-on vehicle can be completed.

In some methods, moving the gearbox from the storage configuration to the operating configuration may include concentrically aligning the through-hole formed in the gearbox with the axle passage formed in the chassis. Inserting the axle through the through-hole and the axle passage may occur after the moving the gearbox from the storage configuration to the operating configuration. In some embodiments, the through-hole and/or axle passage are at least partially obstructed in the storage configuration, thereby preventing insertion of an axle. For example, in the storage configuration, the gearbox through-hole may be at least partially blocked by the chassis or by the channel inboard portion forming the channel, and/or the axle passage may be at least partially blocked by the gearbox.

In some methods, moving the gearbox may include performing a linear translation of the gearbox with respect to the chassis. In some embodiments, multiple linear translations of the gearbox with respect to the chassis may be performed. In some embodiments, the gearbox may be moved along an arc, or along an irregular path of movement. For example, the gearbox may be moved along a straight and/or curved line in any direction with respect to the chassis. The gearbox may be moved inward or outward with respect to the chassis. Some disclosed methods involve a chassis that includes a channel configured to at least partially house the gearbox, the channel optionally having a channel cut-out sized to at least partially receive the electric motor coupled to the gearbox. The chassis (e.g., a channel formed in or on the chassis) may define the path of movement of the gearbox. For example, the gearbox may be moved vertically within a channel in order to configure the chassis assembly for operation. In one specific example, the gearbox may be moved down farther into the channel and then shifted outward towards the exterior of the chassis. In some methods, moving the gearbox may include moving the gearbox such that, in the storage configuration, the electric motor is spaced a first distance from the channel cut-out, and in the operating configuration, the electric motor is spaced a second distance from the channel cut-out, the second distance being smaller than the first distance.

Some methods include unsecuring a fastener coupled to the gearbox and to the channel (e.g., via or through a slot formed in the channel), the fastener being functional to retain the gearbox in the storage configuration when secured, such that unsecuring the fastener releases the gearbox to slide with respect to the channel. The fastener may be re-secured, thereby again securing the gearbox to the channel in the operating configuration. In such methods, re-securing the gearbox may be performed after moving the gearbox from the storage configuration to the operating configuration. For example, a nut and/or bolt may be loosened (e.g., unsecured) to permit movement of the gearbox within the channel. The bolt may extend through the slot, being secured at one end to the gearbox, and a nut may be affixed on the opposite end of the bolt, where the channel inboard portion and channel slot are positioned between the nut and gearbox such that, when tightened, the nut is pressed against the channel inboard portion and holds or retains the gearbox in that position. The nut may be entirely removed in some embodiments, or merely loosened in other embodiments. As the gearbox is moved within the channel, the bolt is configured to slide along the length of the slot. The channel can therefore define the path of movement of the gearbox via the channel inboard portion restricting movement of the gearbox other than along the path of movement and/or via interactions of the slots with one or more fasteners secured to the gearbox. While the example illustrated in FIGS. 5 and 8 show substantially vertical slots, suitable slots can be any shape or length. For example, slots can be cut out of the channel inboard portion that are rounded, horizontal, straight, angled, bent, cornered, polygonal, sinusoidal, etc. Further, channels can include any suitable number of slots. Once the gearbox has been moved to the desired position, the fastener can be resecured in order to retain the gearbox in its new position. For example, once the gearbox has been moved to the operating configuration, one or more fasteners can be tightened, thereby holding the gearbox in place in the operating configuration and preventing movement back towards the storage configuration.

In some methods, a first electric motor may be coupled to a first gearbox, a second electric motor may be coupled to a second gearbox, and configuring the chassis assembly for operation may include moving the first gearbox with respect to the chassis and moving the second gearbox with respect to the chassis. Further, inserting the axle may include inserting the axle through a first through-hole in the first gearbox, a second through-hole in the second gearbox, a first axle passage formed in the chassis, and a second axle passage formed in the chassis (e.g., a single axle can be inserted through both gearboxes' through-holes). In some methods, two or more axles may be inserted (e.g., a first axle may be inserted through the first gearbox and a second axle may be inserted through the second gearbox). In some methods, insertion of the axle may retain the first and second gearboxes in the operating configuration (e.g., inserting the axle through the through-hole and the axle passage may restrict movement of the gearbox towards the storage configuration.)

Illustrative, non-exclusive examples of chassis assemblies, children's ride-on vehicles, and methods of configuring chassis assemblies according to the present disclosure are described in the following enumerated paragraphs:

A1. A chassis assembly for a children's ride-on vehicle, comprising:

a chassis configured to at least partially define a passenger region sized for a child, a lower surface of the chassis defining a lower plane;

a gearbox coupled to the chassis, wherein the gearbox is configured to selectively move with respect to the chassis, along a path of movement, from a storage configuration to an operating configuration, and wherein a greater portion of the gearbox extends beneath the lower plane when the gearbox is in the operating configuration than when the gearbox is in the storage configuration; and an electric motor coupled to the gearbox.

A2. The chassis assembly of paragraph A1, wherein the path of movement includes an arc.

A3. The chassis assembly of any of paragraphs A1-A2, wherein the path of movement includes a linear translation.

A4. The chassis assembly of any of paragraphs A1-A3, wherein the path of movement includes a vertical linear translation from above the lower plane to beneath the lower plane.

A5. The chassis assembly of any of paragraphs A1-A4, wherein the gearbox comprises an axle-receiving portion that comprises a through-hole extending through the gearbox, the through-hole having a through-hole diameter sized to accommodate an axle.

A6. The chassis assembly of paragraph A5, wherein, in the storage configuration, the axle-receiving portion is positioned above the lower plane and the through-hole is at least partially obstructed by the chassis.

A7. The chassis assembly of any of paragraphs A5-A6, wherein, in the operating configuration, at least a portion of the gearbox is positioned beneath the lower plane, and the axle-receiving portion is configured to receive an axle through the through-hole.

A8. The chassis assembly of any of paragraphs A5-A7, wherein the chassis comprises an axle passage configured to receive an axle therethrough, wherein, in the storage configuration, at least a portion of the gearbox is positioned to obstruct the axle passage, and wherein, in the operating configuration, the axle passage is concentrically aligned with the through-hole of the axle-receiving portion of the gearbox to permit insertion of an axle through the axle passage and the through-hole.

A9. The chassis assembly of paragraph A8, further comprising an axle extending through the through-hole and the axle passage, wherein the axle is configured to retain the gearbox in the operating configuration and prevent movement of the gearbox to the storage configuration.

A10. The chassis assembly of any of paragraphs A1-A9, wherein the chassis further comprises a channel configured to receive at least a portion of the gearbox, and wherein the channel is configured to define the path of movement of the gearbox.

A11. The chassis assembly of paragraph A10, wherein the path of movement of the gearbox is linear.

A12. The chassis assembly of any of paragraphs A10-A11, wherein the channel comprises an opening facing away from the lower plane of the chassis, wherein the opening is defined by an inboard portion facing an interior space of the chassis, and wherein the inboard portion comprises a cut-out that is sized to receive at least a portion of the electric motor.

A13. The chassis assembly of paragraph A12, wherein, in the storage configuration, the gearbox is positioned at least partially within the channel such that the electric motor is spaced apart from the cut-out by a first distance, and wherein, in the operating configuration, the gearbox is positioned at least partially within the channel such that the electric motor is spaced apart from the cut-out by a second distance, the second distance being smaller than the first distance.

A14. The chassis assembly of any of paragraphs A12-A13, wherein the cut-out comprises an upward-facing semi-circular region, and wherein the upward-facing semi-circular region has a cut-out diameter that is greater than a motor diameter of the electric motor.

A15. The chassis assembly of any of paragraphs A10-A14, wherein the channel comprises a slot formed in the channel, the slot being configured to define the range of motion of the gearbox within the channel.

A16. The chassis assembly of paragraph A15, wherein the gearbox comprises a fastener, wherein the fastener is configured to extend through the slot, and wherein the fastener is configured to selectively secure the gearbox in at least one of: the storage configuration and the operating configuration.

A17. The chassis assembly of any of paragraphs A1-A16, wherein the chassis comprises a chassis cut-out sized and shaped to receive a corresponding structure of the gearbox, and wherein the corresponding structure contacts the chassis cut-out in the operating configuration.

A18. The chassis assembly of any of paragraphs A1-A17, wherein the electric motor is a first electric motor, wherein the gearbox is a first gearbox having a first through-hole, wherein the chassis assembly further comprises a second electric motor coupled to a second gearbox having a second through-hole.

B1. A children's ride-on vehicle, comprising:
the chassis assembly according to any of paragraphs A1-A18;
an axle extending through the first through-hole of the first gearbox, a/the first axle passage of the chassis, the second through-hole of the second gearbox, and a/the second axle passage of the chassis;
a first drive wheel rotatably coupled to the chassis and coupled to the first gearbox via the axle; and
a second drive wheel rotatably coupled to the chassis and coupled to the second gearbox via the axle.

B2. The children's ride-on vehicle of paragraph B1, further comprising:
a battery assembly adapted to provide power to the electric motor;
a body coupled to the chassis and including a seat sized for a child operator; and
a steering assembly including a steering mechanism adapted to receive steering inputs from a child sitting on the seat.

C1. A method of configuring a children's ride-on vehicle for operation, the children's ride-on vehicle having (i) a chassis defining a lower plane and at least partially defining a passenger region sized for a child, (ii) a gearbox coupled to the chassis, and (iii) an electric motor coupled to a gearbox, the gearbox being selectively positionable between a storage configuration and an operating configuration, wherein a greater portion of the gearbox extends beneath the lower plane in the operating configuration than in the storage configuration, the method comprising:
moving the gearbox with respect to the chassis, along a path of movement defined by the chassis, from the storage configuration to the operating configuration; and
inserting an axle through a through-hole in the gearbox and an axle passage formed in the chassis.

C2. The method of paragraph C1, further comprising coupling a drive wheel to the axle, wherein the gearbox is configured to deliver power from the electric motor to the drive wheel.

C3. The method of any of paragraphs C1-C2, wherein the moving the gearbox from the storage configuration to the operating configuration comprises concentrically aligning the through-hole formed in the gearbox with the axle passage formed in the chassis, and wherein the inserting the axle through the through-hole and the axle passage occurs after the moving the gearbox from the storage configuration to the operating configuration.

C4. The method of any of paragraphs C1-C3, wherein the moving the gearbox comprises performing a linear translation of the gearbox with respect to the chassis.

C5. The method of any of paragraphs C1-C4, wherein the chassis further comprises a channel configured to at least partially house the gearbox, the channel having a channel cut-out sized to at least partially receive the electric motor, and wherein the moving the gearbox comprises moving the gearbox such that, in the storage configuration, the electric motor is spaced a first distance from the channel cut-out, and in the operating configuration, the electric motor is spaced a second distance from the channel cut-out, the second distance being smaller than the first distance.

C6. The method of any of paragraphs C1-05, further comprising:
unsecuring a fastener, the fastener being coupled to the gearbox and to the channel, the fastener being functional to retain the gearbox in the storage configuration when secured, wherein the unsecuring the fastener releases the gearbox to slide with respect to the channel; and
re-securing the gearbox to the channel in the operating configuration using the fastener, wherein the re-securing the gearbox is performed after the moving the gearbox from the storage configuration to the operating configuration.

C7. The method of any of paragraphs C1-C6, wherein the electric motor coupled to the gearbox is a first electric motor coupled to a first gearbox, wherein the children's ride-on vehicle further comprises a second electric motor coupled to a second gearbox, wherein the moving the gearbox with respect to the chassis comprises moving the first gearbox with respect to the chassis and moving the second gearbox with respect to the chassis, and wherein the inserting the axle through the through-hole and the axle passage comprises inserting the axle through a first through-hole in the first gearbox, the axle passage, and a second through-hole in the second gearbox.

C8. The method of any of paragraphs C1-C7, wherein the inserting the axle through the through-hole and axle passage comprises restricting movement of the gearbox towards the storage configuration.

INDUSTRIAL APPLICABILITY

The systems and methods disclosed herein are applicable to the toy vehicle and children's products industries.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, also are regarded as included within the subject matter of the inventions of the present disclosure.

In the event that any of the patent documents that are incorporated by reference herein define a term in a manner that is inconsistent with either the non-incorporated disclosure of the present application or with any of the other incorporated patent documents, the non-incorporated disclosure of the present application shall control with respect to the present the term or terms as used in an incorporated patent document shall only control with respect to the document in which the term or terms are defined.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A chassis assembly for a children's ride-on vehicle, comprising:
   a chassis configured to at least partially define a passenger region sized for a child, a lower surface of the chassis defining a lower plane;
   a gearbox coupled to the chassis, wherein the gearbox is configured to selectively move with respect to the chassis, along a path of movement, from a storage configuration to an operating configuration, and wherein a greater portion of the gearbox extends beneath the lower plane when the gearbox is in the operating configuration than when the gearbox is in the storage configuration; and
   an electric motor coupled to the gearbox.

2. The chassis assembly of claim 1, wherein the path of movement includes an arc.

3. The chassis assembly of claim 1, wherein the path of movement includes a linear translation.

4. The chassis assembly of claim 3, wherein the path of movement includes a vertical linear translation from above the lower plane to beneath the lower plane.

5. The chassis assembly of claim 1, wherein the gearbox comprises an axle-receiving portion that comprises a through-hole extending through the gearbox, the through-hole having a through-hole diameter sized to accommodate an axle.

6. The chassis assembly of claim 5, wherein, in the storage configuration, the axle receiving portion is positioned above the lower plane, and the through-hole is at least partially obstructed by the chassis.

7. The chassis assembly of claim 5, wherein, in the operating configuration, at least a portion of the gearbox is positioned beneath the lower plane, and the axle-receiving portion is configured to receive an axle through the through-hole.

8. The chassis assembly of claim 5, wherein the chassis comprises an axle passage configured to receive an axle therethrough, wherein, in the storage configuration, at least a portion of the gearbox is positioned to obstruct the axle passage, and wherein, in the operating configuration, the axle passage is concentrically aligned with the through-hole of the axle-receiving portion of the gearbox to permit insertion of the axle through the axle passage and the through-hole.

9. The chassis assembly of claim 8, further comprising the axle extending through the through-hole and the axle passage, wherein the axle is configured to retain the gearbox in the operating configuration and prevent movement of the gearbox to the storage configuration.

10. The chassis assembly of claim 8, wherein the electric motor is a first electric motor, wherein the gearbox is a first gearbox having a first through-hole, and wherein the chassis assembly further comprises a second electric motor coupled to a second gearbox having a second through-hole.

11. A children's ride-on vehicle, comprising:
the chassis assembly according to claim 10;
an axle extending through the first through-hole of the first gearbox, the axle passage of the chassis, and the second through-hole of the second gearbox;
a first drive wheel rotatably coupled to the chassis and coupled to the first gearbox via the axle; and
a second drive wheel rotatably coupled to the chassis and coupled to the second gearbox via the axle.

12. The children's ride-on vehicle of claim 11, further comprising:
a battery assembly adapted to provide power to the first electric motor and the second electric motor;
a body coupled to the chassis and including a seat sized for a child operator; and
a steering assembly including a steering mechanism adapted to receive steering inputs from a child sitting on the seat.

13. The chassis assembly of claim 1, wherein the chassis further comprises a channel configured to receive at least a portion of the gearbox, and wherein the channel is configured to define the path of movement of the gearbox.

14. The chassis assembly of claim 13, wherein the path of movement of the gearbox is linear.

15. The chassis assembly of claim 14, wherein the channel comprises an opening facing away from the lower plane of the chassis, wherein the opening is defined by an inboard portion facing an interior space of the chassis, and wherein the inboard portion comprises a cut-out that is sized to receive at least a portion of the electric motor.

16. The chassis assembly of claim 15, wherein, in the storage configuration, the gearbox is positioned at least partially within the channel such that the electric motor is spaced apart from the cut-out by a first distance, and wherein, in the operating configuration, the gearbox is positioned at least partially within the channel such that the electric motor is spaced apart from the cut-out by a second distance, the second distance being smaller than the first distance.

17. The chassis assembly of claim 16, wherein the cut-out comprises an upward-facing semi-circular region, and wherein the upward-facing semi-circular region has a cut-out diameter that is greater than a motor diameter of the electric motor.

18. The chassis assembly of claim 13, wherein the channel comprises a slot formed in the channel, the slot being configured to define the range of motion of the gearbox within the channel.

19. The chassis assembly of claim 18, wherein the gearbox comprises a fastener, wherein the fastener is configured to extend through the slot, and wherein the fastener is configured to selectively secure the gearbox in at least one of: the storage configuration and the operating configuration.

20. The chassis assembly of claim 1, wherein the chassis comprises a chassis cut-out sized and shaped to receive a corresponding structure of the gearbox, and wherein the corresponding structure contacts the chassis cut-out in the operating configuration.

21. A method of configuring a children's ride-on vehicle for operation, the children's ride-on vehicle having (i) a chassis defining a lower plane and at least partially defining a passenger region sized for a child, (ii) a gearbox coupled to the chassis, and (iii) an electric motor coupled to a gearbox, the gearbox being selectively positionable between a storage configuration and an operating configuration, wherein a greater portion of the gearbox extends beneath the lower plane in the operating configuration than in the storage configuration, the method comprising:
moving the gearbox with respect to the chassis, along a path of movement defined by the chassis, from the storage configuration to the operating configuration; and
inserting an axle through a through-hole in the gearbox and an axle passage formed in the chassis.

22. The method of claim 21, further comprising coupling a drive wheel to the axle, wherein the gearbox is configured to deliver power from the electric motor to the drive wheel.

23. The method of claim 21, wherein the moving the gearbox from the storage configuration to the operating configuration comprises concentrically aligning the through-hole formed in the gearbox with the axle passage formed in the chassis, and wherein the inserting the axle through the through-hole and the axle passage occurs after the moving the gearbox from the storage configuration to the operating configuration.

24. The method of claim 21, wherein the moving the gearbox comprises performing a linear translation of the gearbox with respect to the chassis.

25. The method of claim 24, wherein the chassis further comprises a channel configured to at least partially house the gearbox, the channel having a channel cut-out sized to at least partially receive the electric motor, and wherein the moving the gearbox comprises moving the gearbox such that, in the storage configuration, the electric motor is spaced a first distance from the channel cut-out, and in the operating configuration, the electric motor is spaced a second distance from the channel cut-out, the second distance being smaller than the first distance.

26. The method of claim 25, further comprising:
unsecuring a fastener, the fastener being coupled to the gearbox and to the channel, the fastener being functional to retain the gearbox in the storage configuration when secured, wherein the unsecuring the fastener releases the gearbox to slide with respect to the channel; and
re-securing the gearbox to the channel in the operating configuration using the fastener, wherein the re-securing the gearbox is performed after the moving the gearbox from the storage configuration to the operating configuration.

27. The method of claim 21, wherein the electric motor coupled to the gearbox is a first electric motor coupled to a first gearbox, wherein the children's ride-on vehicle further comprises a second electric motor coupled to a second gearbox, wherein the moving the gearbox with respect to the chassis comprises moving the first gearbox with respect to the chassis and moving the second gearbox with respect to the chassis, and wherein the inserting the axle through the through-hole and the axle passage comprises inserting the axle through a first through-hole in the first gearbox, the axle passage, and a second through-hole in the second gearbox.

28. The method of claim 21, wherein the inserting the axle through the through-hole and the axle passage comprises restricting movement of the gearbox towards the storage configuration.

* * * * *